United States Patent
Oka

(10) Patent No.: US 8,441,471 B2
(45) Date of Patent: May 14, 2013

(54) LIGHT SOURCE DEVICE AND DISPLAY DEVICE INCLUDING THE SAME

(75) Inventor: Hidekazu Oka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 566 days.

(21) Appl. No.: 12/744,707

(22) PCT Filed: Aug. 20, 2008

(86) PCT No.: PCT/JP2008/064784
§ 371 (c)(1),
(2), (4) Date: May 26, 2010

(87) PCT Pub. No.: WO2009/069346
PCT Pub. Date: Jun. 4, 2009

(65) Prior Publication Data
US 2010/0302226 A1    Dec. 2, 2010

(30) Foreign Application Priority Data
Nov. 29, 2007  (JP) ................................ 2007-308134

(51) Int. Cl.
*G06F 3/038* (2006.01)
*G09G 5/00* (2006.01)

(52) U.S. Cl.
USPC .............. 345/211; 345/107; 345/690; 349/56

(58) Field of Classification Search .............. 345/87–89, 345/107, 211–213, 690; 349/56, 61, 84, 349/110
See application file for complete search history.

(56) References Cited

U.S. PATENT DOCUMENTS

| 6,437,900 | B1 | 8/2002 | Cornelissen et al. |
| 6,842,165 | B2 | 1/2005 | Inoue |
| 7,612,760 | B2 | 11/2009 | Kawai |
| 2003/0117424 | A1 | 6/2003 | Kinoshita et al. |
| 2004/0036951 | A1 | 2/2004 | Johnson et al. |

(Continued)

FOREIGN PATENT DOCUMENTS

| CN | 1459046 A | 11/2003 |
| JP | 1-149622 U | 10/1989 |

(Continued)

OTHER PUBLICATIONS

Official Communication issued in corresponding Chinese Patent Application No. 200880118384, mailed on Jul. 5, 2011.
Official Communication issued in International Patent Application No. PCT/JP2008/064784, mailed on Sep. 22, 2008.

*Primary Examiner* — Kimnhung Nguyen
(74) *Attorney, Agent, or Firm* — Keating & Bennett, LLP

(57) ABSTRACT

A light source device with an improved contrast ratio between a bright portion and a dark portion of a displayed image and a display divide including the light source device. In order to change a reflectance of a portion of a reflection sheet 110, 111 with gradation in response to light and dark of portions of an image displayed on a display panel 201, a control mechanism 202 arranged to control the display panel 201 is provided. A first storing mechanism 104 and a second storing mechanism 105 arranged to store signals generated by the control mechanism 202, a calculation mechanism 103 arranged to calculate reflectances of portions of the reflection sheet 110, 111, a third storing mechanism 106 arranged to store the reflectances calculated by the calculation mechanism 103, and a reflectance control mechanism 107 arranged to control the reflection sheet 110, 111 based on the reflectances are provided.

6 Claims, 11 Drawing Sheets

U.S. PATENT DOCUMENTS

| | | |
|---|---|---|
| 2005/0162377 A1* | 7/2005 | Zhou et al. .................... 345/107 |
| 2006/0197738 A1* | 9/2006 | Kawai .......................... 345/107 |
| 2007/0024594 A1 | 2/2007 | Sakata et al. |
| 2007/0063965 A1* | 3/2007 | Kawai .......................... 345/107 |
| 2008/0309811 A1 | 12/2008 | Fujinawa et al. |

FOREIGN PATENT DOCUMENTS

| | | |
|---|---|---|
| JP | 2004-163566 A | 6/2004 |
| JP | 2007-133013 A | 5/2007 |
| JP | 2008-111944 A | 5/2008 |

\* cited by examiner

LIGHT SOURCE DEVICE AND DISPLAY DEVICE INCLUDING THE SAME

BACKGROUND OF THE INVENTION

1. Field of the Invention

The present invention relates to a light source device and a display device including the same. More specifically, the present invention relates to a light source device that is suitably used in a display device having a non-self-emissive transmission type or transflective type display panel and a display device including the same.

2. Description of the Related Art

A display device having a transmission type or transflective type liquid crystal display panel is generally configured such that a light source device (also called a backlight unit) is disposed on the back side of a liquid crystal display panel. A light source device to be incorporated in this kind of display device has light sources such as cold cathode fluorescent tubes. Light is emitted from the light sources, characteristics of the light are adjusted, and the light is projected to the back side of the liquid crystal display panel. The projected light is transmitted through the liquid crystal display panel, making an image displayed visible on the front side of the liquid crystal display panel.

FIG. 14 is an exploded perspective view schematically showing the configuration of a display device 9 including a direct type light source device. As shown in FIG. 14, the display device (the light source device) 9 includes light sources 91, a reflection sheet 92 arranged to diffusely reflect light emitted from the light sources 91, and optical sheets 93 arranged to adjust characteristics of the light emitted from the light sources 91 and the diffusely reflected light.

The reflection sheet 92 diffusely reflects the light emitted from the light sources 91 in order to make intensity in a planer direction of the light exiting from the light source device 9 uniform and to improve luminance by effectively using the light emitted from the light sources 91. In view of this, the reflection sheet 92 is substantially white in the entire surface and has a surface texture that allows for the diffuse reflection of the light.

In order to achieve image display of high quality, it is preferable to improve a luminance of a bright portion of an image displayed on a liquid crystal display panel 94 and lower a luminance of a dark portion of the image. In other words, it is preferable to improve the contrast ratio. Although the use of the reflection sheet 92 described above can improve a luminance of the bright portion of the image displayed on the liquid crystal display panel 94, it also improves luminance of the dark portion of the image. Thus, the display device (the light source device) 9 using the reflection sheet 92 has difficulty in improving the contrast ratio.

As a prior art literature relating to the present invention, Japanese Utility Model Laid-open Publication No. H01-149622 is cited.

SUMMARY OF THE INVENTION

An object of the invention is to overcome the problems described above and to provide a light source device that can provide an improved contrast ratio between a bright portion and a dark portion of a displayed image, and a display device including the light source device. Another object of the present invention is to provide a light source device that can provide a lower luminance of a dark portion of a displayed image, and a display device including the light source device.

In order to overcome the problems described above, preferred embodiments of the present invention provide a display device including a light source arranged to emit light, and a reflection sheet arranged to reflect the light emitted from the light source, and a reflectance of a surface of the reflection sheet is changeable with gradation.

It is preferable that the surface of the reflection sheet is divided into a plurality of regions and reflectances of the divided regions are independently changeable with gradation. In addition, it is preferable that the reflection sheet may include a plurality of pixel electrodes and switching elements arranged to drive the plurality of pixel electrodes.

The reflection sheet is preferably an electric paper.

Preferred embodiments of the present invention also provide a display device including the light source device, and a display panel arranged to display an image, and a reflectance of at least a portion of the surface of the reflection sheet of the light source device is changeable with gradation in response to luminance of the image displayed on the display panel.

It is preferable that the display device includes a control mechanism arranged to control the display panel such that a reflectance of a portion of the reflection sheet of the light source device is changed with gradation in response to light and dark of portions of the image displayed on the display panel, and the light source device further includes a first storing mechanism and a second storing mechanism arranged to store signals generated by the control mechanism, a calculation mechanism arranged to calculate reflectances of portions of the reflection sheet based on the signals stored in the first storing mechanism and the second storing mechanism, a third storing mechanism arranged to store the reflectances calculated by the calculation mechanism, and a reflectance control mechanism arranged to control the reflection sheet based on the reflectances stored in the third storing mechanism.

The second storing mechanism may accumulatively store image data of a plurality of frames of the image displayed on the display panel, and the calculation mechanism may calculate the reflectance based on an average luminance of the image data accumulatively stored in the second storing mechanism.

The display device may further include an average luminance detection unit arranged to detect average luminances of portions of the image displayed on the display panel, and reflectances of portions of the reflection sheet may be changed with gradation based on the average luminances of the portions of the image displayed on the display panel that are detected by the average luminance detection unit.

According to the present invention, the reflectance of the reflection sheet can be partially changed with gradation (or the reflectances of the divided regions are independently changed with gradation). Accordingly, the luminance of the dark portion of the displayed image can be lowered. Thus, the contrast ratio can be improved.

DETAILED DESCRIPTION OF PREFERRED EMBODIMENTS

A detailed description of preferred embodiments of the present invention will now be provided with reference to the accompanying drawings.

Figure 1:
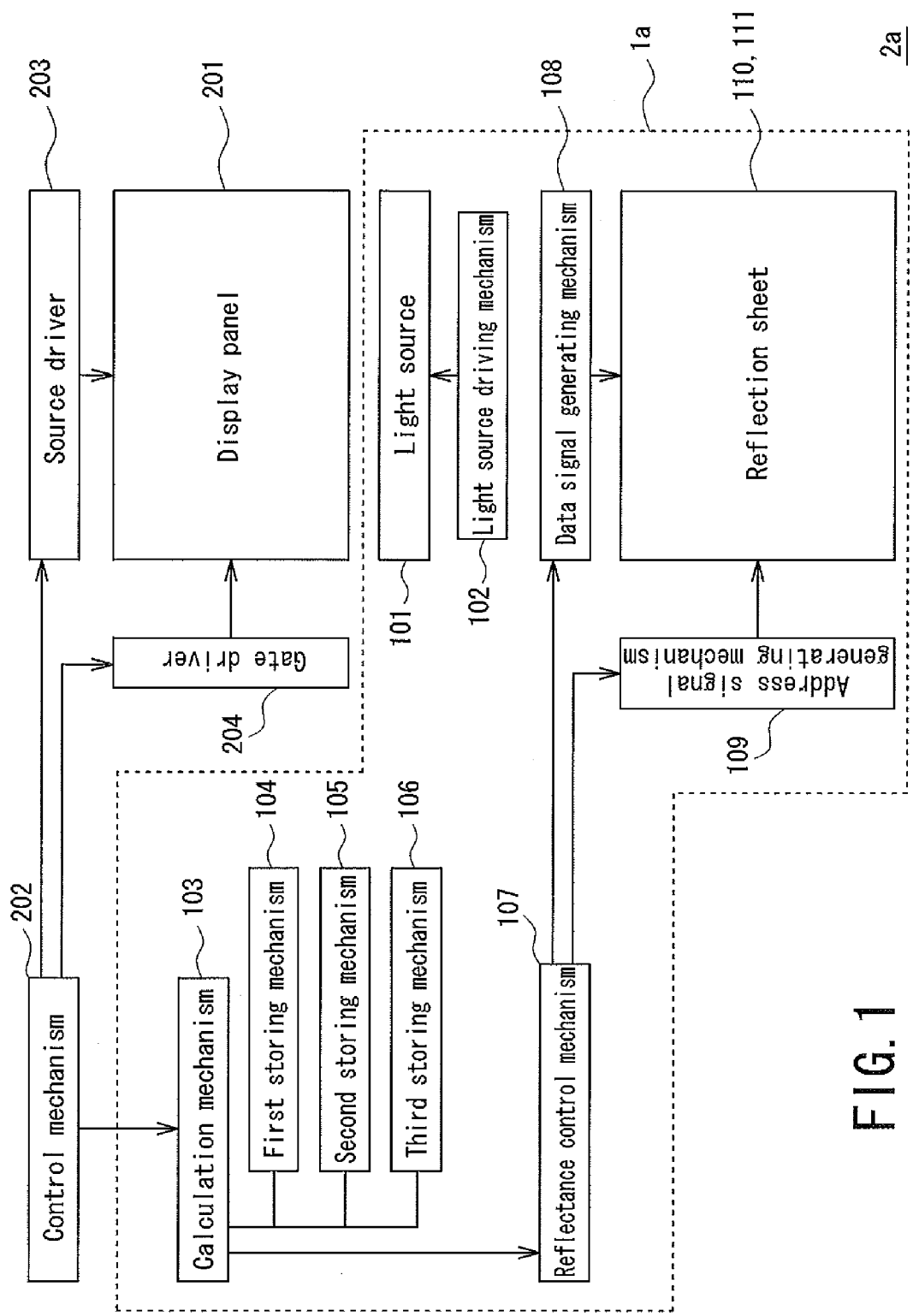
FIG. 1 is a block diagram schematically showing the configuration of a light source device according to a first preferred embodiment of the present invention and a display device according the first preferred embodiment of the present invention.

FIG. 1 is a block diagram schematically showing a configuration of a light source device 1a and a display device 2a including the light source device 1a according to a first preferred embodiment of the present invention.

As shown in FIG. 1, the light source device 1a according to the first preferred embodiment of the present invention includes light sources 101, a light source driving mechanism 102, a calculation mechanism 103, a first storing mechanism 104, a second storing mechanism 105, a third storing mechanism 106, a reflectance control mechanism 107, a data signal generating mechanism 108, an address signal generating mechanism 109, and a reflection sheet 110.

The display device 2a according to the first preferred embodiment of the present invention includes the light source device 1a according to the first preferred embodiment of the present invention, a display panel 201, a control mechanism 202, source drivers 203, and gate drivers 204.

The light sources 101 of the light source device 1a are disposed on the back side of the display panel 201 of the display device 2a according to the first preferred embodiment of the present invention. The reflection sheet 110 of the light source device 1a is additionally disposed on the back side. In other words, the light source device 1a and the display device 2a according to the first preferred embodiment of the present invention are disposed such that the back surface of the display panel 201 of the display device 2a and the front surface of the reflection sheet 110 of the light source device 1a face substantially parallel to each other, and that the light sources 101 of the light source device 1a (and other given optical members (not shown)) are disposed between the display panel 201 of the display device 2a and the reflection sheet 110 of the light source device 1a.

According to the configuration described above, light emitted from the light sources 101 of the light source device 1a according to the first preferred embodiment of the present invention is directly projected to or is reflected by the reflection sheet 110 and then projected to the back side of the display panel 201 of the display device 2a according to the first preferred embodiment of the present invention. The light projected to the back side of the display panel 201 of the display device 2a is transmitted through the display panel 201 of the display device 2a, making an image displayed visible on the front side of the display panel 201 of the display device 2a. Detailed descriptions of the physical configuration of the light source device 1a according to the first preferred embodiment of the present invention and the physical configuration of the display device 2a according to the first preferred embodiment of the present invention will be provided later.

The reflection sheet 110 is arranged to reflect the light emitted from the light sources 101 and is a member having a sheet shape or a plate shape. The reflection sheet 110 has a plurality of pixels 301 that have a matrix arrangement. The pixels 301 are each provided with pixel electrodes 302 and switching elements 303 arranged to drive the pixel electrodes 302. For the switching elements 303, TFTs (thin film transistors) may be used. The reflection sheet 110 further has a plurality of gate signal lines 304 arranged to transmit address signals to gate electrodes of the switching elements 303 of the pixels 301 and a plurality of data signal lines 305 arranged to transmit data signals (gradation signals) to source electrodes of the switching elements 303.

The address signal generating mechanism 109 is arranged to transmit selection pulses to the gate signal lines 304 of the reflection sheet 110. The data signal generating mechanism 108 is arranged to transmit data signals (gradation signals) to the data signal lines 305 of the reflection sheet 110. Thus, the switching elements 303 of the reflection sheet 110 are independently matrix driven, and accordingly, the pixels 301 are independently matrix driven.

Reflectances of the surfaces of the pixels 301 of the reflection sheet 110 can be independently changed with gradation having two values of white and black or greater values. In other words, the reflectances of the surfaces of the pixels 301 can be changed in stages or smoothly.

Figure 2:
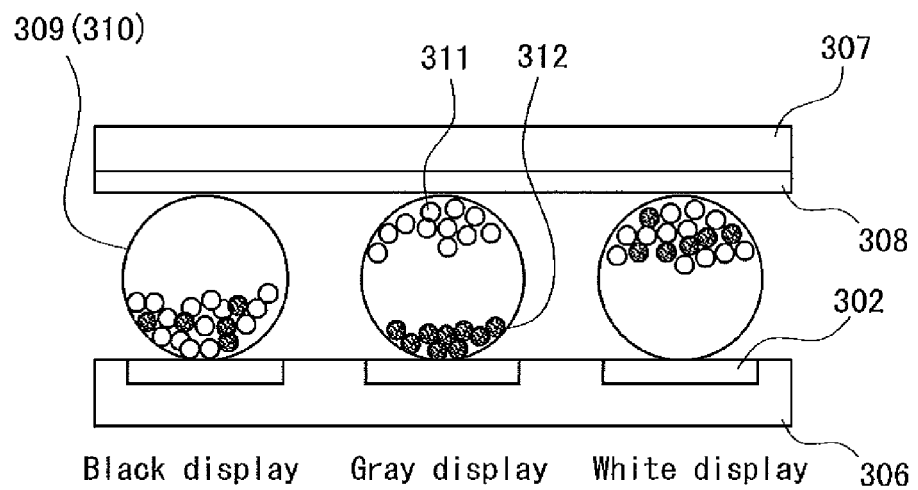
FIG. 2 is a cross sectional view schematically showing a configuration of pixels of a reflection sheet in which reflectances of the pixels are changed with gradation.

FIG. 2 is a cross sectional view schematically showing a configuration of the pixels 301 of the reflection sheet 110 in which the reflectances of the pixels 301 are independently changed with gradation. As shown in FIG. 2, the reflection sheet 110 includes first and second substrates 306 and 307 that face substantially parallel to each other and numbers of microcapsules 309 disposed therebetween.

The first substrate 306 is provided with the pixel electrodes 302. The switching elements (TFTs: thin film transistor) 303 (not shown) arranged to drive the pixel electrodes 302 are provided to the pixel electrodes 302. In addition, the plurality of gate signal lines 304 (not shown) arranged to transmit address signals to the gate electrodes of the switching elements 303 of the pixels 301 and the plurality of data signal lines 305 (not shown) arranged to transmit data signals (gradation signals) to the source electrodes of the switching elements 303 are provided. The second substrate 307 is provided with a common electrode 308.

As a result, the microcapsules 309 are sandwiched between the pixel electrodes 302 of the first substrate 306 and the common electrode 308 of the second substrate 307. By using the pixel electrodes 302 and the common electrode 308, voltage can be applied to the microcapsules 309. The microcapsules 309 seal in electrically insulative liquids 310 and migration particles 311 and 312 capable of migrating in the insulative liquids 310.

The migration particles 311 and 312 are charged particles, and each of the microcapsules 309 seals in the migration particles 311 and 312 that have different amounts of electrical charge. The amount of electrical charge of the migration particles 311 is twice as much as the amount of electrical charge of the migration particles 312. The voltage applied by the pixel electrodes 302 and the common electrode 308 make the migration particles 311 and 312 migrate in the insulative liquids 310.

In this configuration, when the voltage is applied to the microcapsules 309 by the pixel electrodes 302 and the common electrode 308, the migration particles 311 and 312 have different behaviors according to the value of the applied voltage (or duration of voltage application) and the amounts of electrical charge of the migration particles 311 and 312. To be more specific, when the microcapsules 309 are applied with a low voltage (or duration of voltage application is short), the particles 311 having the greater amount of electrical charge greatly migrate, and the particles 312 having the smaller amount of electrical charge hardly migrate, as shown in FIG. 2. When the microcapsules 309 are applied with a high voltage (or duration of voltage application is long), both of the particles 311 having the greater amount of electrical charge and the particles 312 having the smaller amount of electrical charge greatly migrate. As described above, the difference between the amounts of electrical charge of the migration particles 311 and 312 and the difference between the voltages applied to the microcapsules 309 by the pixel electrodes 302 and the common electrodes 308 have an influence on the behaviors of the migration particles 311 and 312.

The difference between the behaviors of the migration particles 311 and 312 has an influence on the reflectances of the pixels 301 of the reflection sheet 110. To be specific, the degree of concentration of the migration particles 311 and 312 to the pixel electrodes 302 side or the common electrode 308 side differs between when only the particles 311 having the greater amount of electrical charge greatly migrate and when both of the particles 311 having the greater amount of electrical charge and the particles 312 having the smaller amount of electrical charge greatly migrate.

If the degree of concentration of the migration particles 311 and 312 to the pixel electrodes 302 side or the common electrode 308 side differs, the reflectances of the surfaces of the pixels 301 are changed according to the degree of concentration of the migration particles 311 and 312. In the reflection sheet 110 having the configuration described above, the reflectances of the surfaces of the pixels 301 can be changed in stages (with gradation having at least two values of white and black) by adjusting the value of voltage to be applied to the microcapsules 309.

Figure 3:
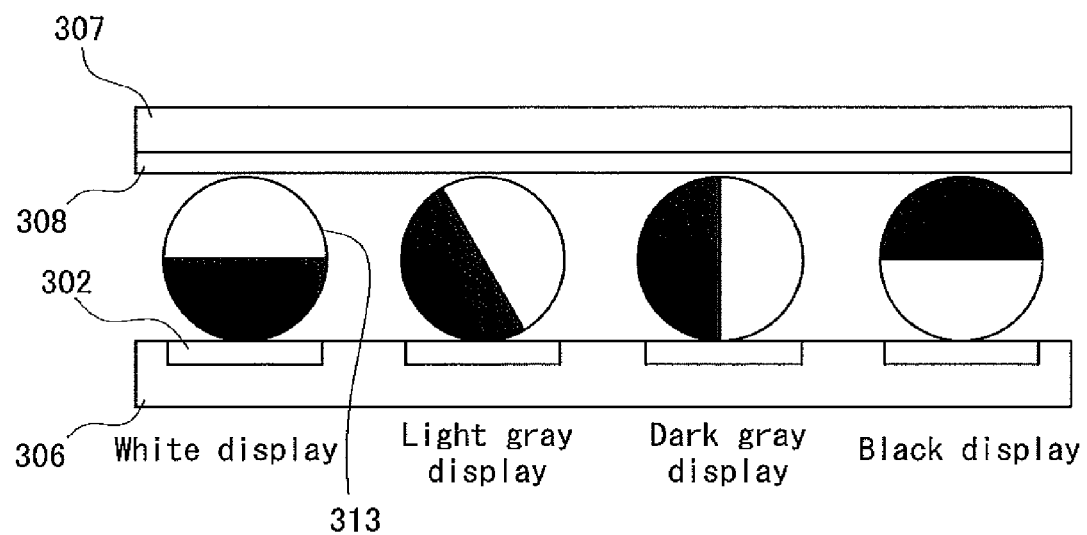
FIG. 3 is a cross sectional view schematically showing a configuration of pixels of another reflection sheet in which reflectances of the pixels are changed with gradation.

FIG. 3 is a cross sectional view schematically showing a configuration of another reflection sheet. As shown in FIG. 3, a reflection sheet 111 includes the first and second substrates 306 and 307 that face substantially parallel to each other and numbers of micro-balls 313 that are sandwiched therebetween.

The first substrate 306 is provided with the pixel electrodes 302. The pixel electrodes 302 are provided with the switching elements (TFTs: thin film transistors) 303 (not shown) arranged to drive the pixel electrodes 302. In addition, the plurality of gate signal lines 304 arranged to transmit address signals to the gate electrodes of the switching elements 303 of the pixels 301 and the plurality of data signal line 305 arranged to transmit data signals (gradation signals) to the source electrodes of the switching elements 303 are provided. The common electrode 308 is disposed on the second substrate 307. At least one of the first and second substrates 306 and 307 is substantially transparent, and the pixel electrodes 302 and the common electrode 308 are also substantially transparent.

The micro-balls 313 are sandwiched between the pixel electrodes 302 of the first substrate 306 and the common electrode 308 of the second substrate 307. The pixel electrodes 302 and the common electrode 308 apply voltage to the micro-balls 313. In other words, the micro-balls 313 are placed in an electric field.

The micro-balls 313 that are sandwiched between the pixel electrodes 302 and the common electrode 308 are capable of rotating (self-rotating). The micro-balls 313 are electric dipoles. Hemispheres of one micro-ball 313 have different reflectances. In other words, one of the hemispheres has a high reflectance (e.g., white) and the other one has a low reflectance (e.g., black).

Owing to this configuration, rotation angles of the micro-balls 313 are changed in accordance with the values of the voltages to be applied to the micro-balls 313 by the pixel electrodes 302 and the common electrode 308 of the first and second substrates 306 and 307 (i.e., in accordance with the electric field). The macroscopic reflectances of the pixels 301 of the reflection sheet 111 are changed in accordance with the observable proportions of the hemispheres with high reflectances and the hemispheres with low reflectances. In other words, if the observable proportion of the hemispheres with high reflectances is great (if the hemispheres with high reflectances face the viewer), the macroscopic reflectances of the pixels 301 of the reflection sheet 111 become high. If the observable proportion of the hemispheres with low reflectances is high (if the hemispheres with low reflectances face the viewer), the macroscopic reflectances of the pixels 301 of the reflection sheet 111 become low. As described above, the macroscopic reflectances of the pixels 301 of the reflection sheet 111 are changed in accordance with the observable proportion of the hemispheres with high reflectances (or the observable proportion of the hemispheres with low reflectances).

The observable proportions of the hemispheres with high reflectances and the hemispheres with low reflectances of the micro-balls 313 are changed in accordance with the rotation (self-rotation) angles of the micro-balls 313. Thus, the reflectances of the pixels 301 are changed in accordance with the values of the voltages applied to the micro-balls 313 by the pixel electrodes 302 and the common electrode 308 of the first and second substrates 306 and 307 (the condition of the electric field provided by the pixel electrodes 302 and the common electrode 308). By changing the voltages applied to the micro-balls 313 (i.e., the electric field provided by the pixel electrodes 302 and the common electrode 308) in stages or smoothly, the reflectances of the pixels 301 of the reflection sheet 111 can be changed in stages or smoothly.

Publicly known electric papers may be used as the reflection sheet 110, 111. The electric paper used as the reflection sheet 110, 111 may be an active matrix drive type electric paper or a passive matrix drive type electric paper. For the reflection sheet 110, 111, electric papers that are described in Japanese Patent Application Laid-open Publication No. 2006-227249, Japanese Patent Application Laid-open Publication No. 2007-41169, International Publication No. WO 01/091096, and Japanese Patent Application Laid-open Publication No. 2004-163566 may be used, for example.

Referring to FIG. 1, the first storing mechanism 104 is arranged to store data of an image of the immediately preceding frame to an image displayed on the display panel 201 of the display device 2a. The second storing mechanism 105 is arranged to accumulatively store image data of a plurality of frames of the image displayed on the display panel 201 of the display device 2a. The calculation mechanism 103 is arranged to calculate the reflectances of the pixels 301 of the reflection sheet 110, 111 based on the image (light and dark of portions of the image) displayed on the display panel 201 of the display device 2a. The third storing mechanism 106 is arranged to store the reflectances of the pixels 301 of the reflection sheet 110, 111 that are calculated by the calculation mechanism 103.

The reflectance control mechanism 107 is arranged to convert the reflectances of the pixels 301 that are calculated by the calculation mechanism 103 and are stored in the third storing mechanism 106 to reflectance control signals. The reflectance control signals are outputted to the data signal generating mechanism 108 and the address signal generating mechanism 109. The data signal generating mechanism 108 and the address signal generating mechanism 109 control the reflectances of the pixels 301 of the reflection sheet 110, 111 based on the transmitted reflectance control signals.

For the light sources 101, fluorescent tubes such as cold cathode fluorescent tubes and hot cathode fluorescent tubes may be used. The light source driving mechanism 102 turns on the light sources 101. If the light sources 101 are fluorescent tubes, the light source driving mechanism 102 includes an inverter circuit, for example.

For the display panel 201, a transmission type or transflective type display panel, specifically, a conventionally used active matrix type liquid crystal display panel may be used. The active matrix type liquid crystal display panel is provided with a TFT array substrate and a color filter. The TFT array substrate and the color filter are located substantially parallel to each other leaving a given minute gap therebetween, and seal in liquid crystals. Pixel electrodes are arranged on the TFT array substrate, and switching elements (e.g., TFTs) are connected to the pixel electrodes. Data signal lines arranged to transmit data signals to source electrodes of the switching elements and scanning signal lines arranged to transmit selection pulses to gate electrodes of the switching elements are provided on the TFT array substrate.

The control mechanism 202 controls the source drivers 203 and the gate drivers 204 based on image signals inputted from the outside in order that a given image may be displayed on the display panel 201. The source drivers 203 generate data signals of the image to be displayed based on signals generated by the control mechanism 202. The generated data signals are transmitted to source electrodes of given switching elements through the data signal lines of the TFT array substrate. The selection pulses are generated by the gate drivers 204 based on the signals generated by the control mechanism 202. The generated selection pulses are transmitted to gate electrodes of switching elements of given pixel electrodes through the scanning signal lines of the TFT array substrate.

The configuration described above allows the calculation mechanism 103 and the reflection control mechanism 107 to control the reflectances of the pixels 301 of the reflection sheet 110, 111 in accordance with gradations in luminance of the portions of the image (the pixels) displayed on the display panel 201. In other words, the configuration described above allows for lowering of the reflectances of the pixels 301 of the reflection sheet 110, 111 that correspond to pixels with low luminances (i.e., dark) in the image displayed on the display panel 201 (i.e., the pixels 301 of the reflection sheet 110, 111 that are located on the back side of the pixels with lower luminances of the display panel 201). Accordingly, the luminances of the dark portions of the image displayed on the display panel 201 of the display device 2a can be lowered, and as a result, improvement of the contrast ratio can be achieved.

A response time of the electric paper is about 10 to 20 times larger than a response time of the liquid crystal display panel. Thus, image data are accumulatively stored in the third storing mechanism 106, and if, for example, dark portions are detected for more than a set time period, the reflectances of the portions are lowered. Owing to this configuration, the difference between the response time of the display panel 201 and the response time of the reflection sheet 110, 111 (the electric paper) can be decreased.

Next, descriptions of modified examples of the configuration of the reflection sheet 110, 111 will be provided.

Figure 4:
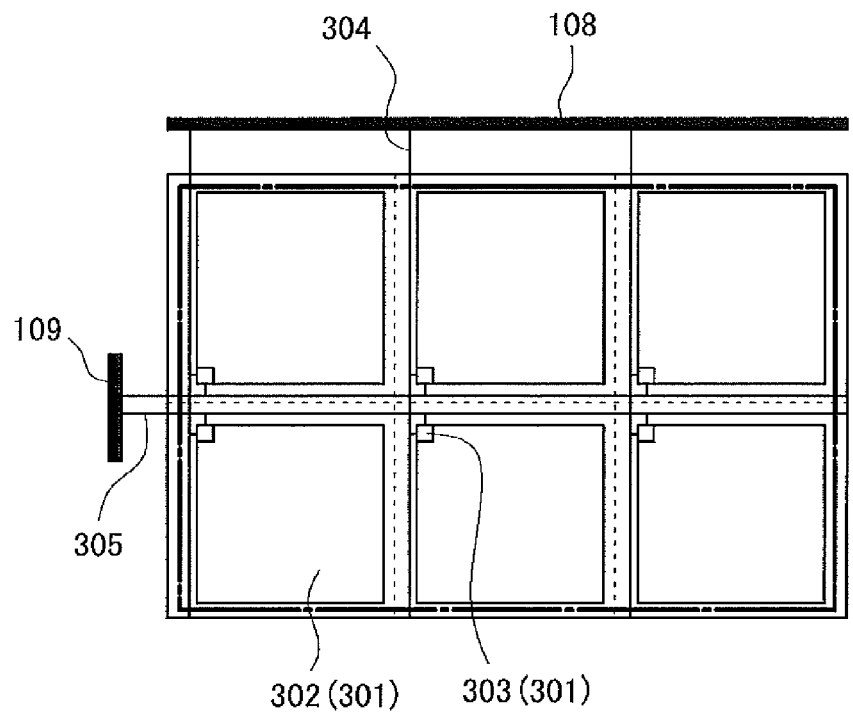
FIG. 4 is a view showing an example of a configuration of an electrode pattern in which the reflection sheet is divided into a plurality of regions and reflectances of the divided regions are independently controlled.

FIG. 4 is a view showing an example of the configuration of an electrode pattern in a case where the reflection sheet 110, 111 is divided into a plurality of regions 314 and reflectances of the divided regions 314 are independently controlled. In FIG. 4, the reflection sheet 110, 111 is divided into six regions 314 and reflectances of the regions 314 are independently controlled. The gate signal lines 304 of the reflection sheet 110, 111 are connected to the address signal generating mechanism 109. In order to make the address signal generating mechanism 109 compact, the gate signal lines 304 are collectively provided at a substantial center of the reflection sheet 110, 111. The data signal lines 305 are connected to the data signal generating mechanism 108 in order to independently control the pixel electrodes 302 connected to drain electrodes of the switching elements 303.

Figure 5:
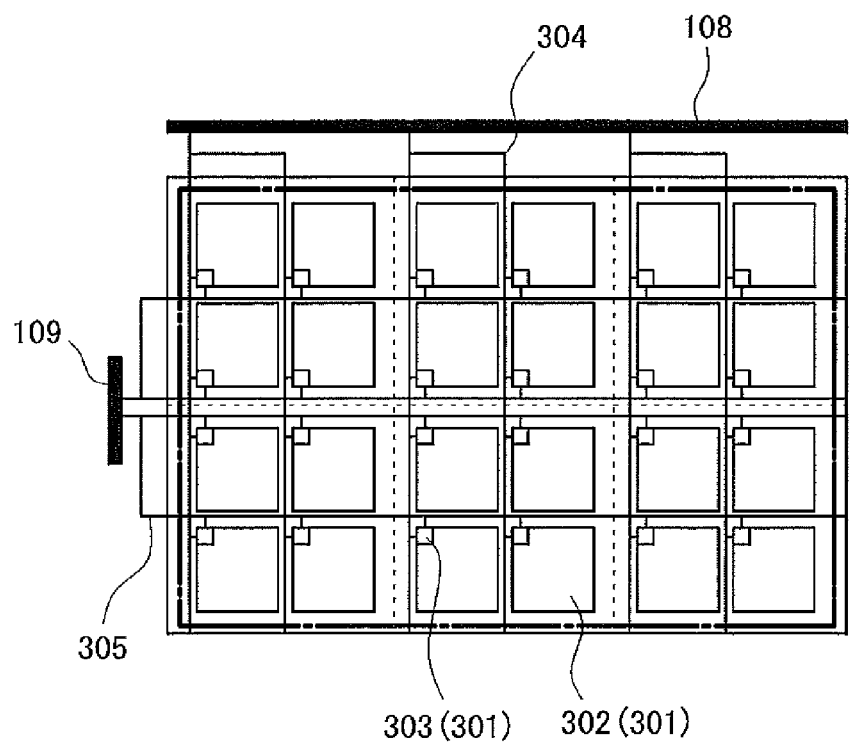
FIG. 5 is a view showing another example of a configuration in which the reflection sheet is divided into six regions and reflectances of the divided regions are independently controlled.

FIG. 5 is a view showing another example of the configuration in which the reflection sheet 110, 111 is divided into six regions and reflectances of the divided regions are independently controlled. When one region 314 corresponds to one pixel 301 as shown in FIG. 4, the area of one pixel electrode 302 may be large. If the area of one pixel electrode 302 is large, delay in transmission of electric signals could occur under the influence of parasitic capacitances. In FIG. 5, a plurality of pixel electrodes 302 are provided in one region 314 (i.e., one region 314 is constituted of a plurality of pixel electrodes 302), and accordingly, the area of one pixel electrode 302 is small. Thus, the occurrence of delay in transmission of electric signals can be prevented.

When the reflectances of all of the pixels 301 in one region 314 are controlled to be equal, wiring may be performed such that the gate signal line 304 and the data signal line 305 are shared by the pixels 301 in one region 314 as shown in FIG. 5.

Figure 6:
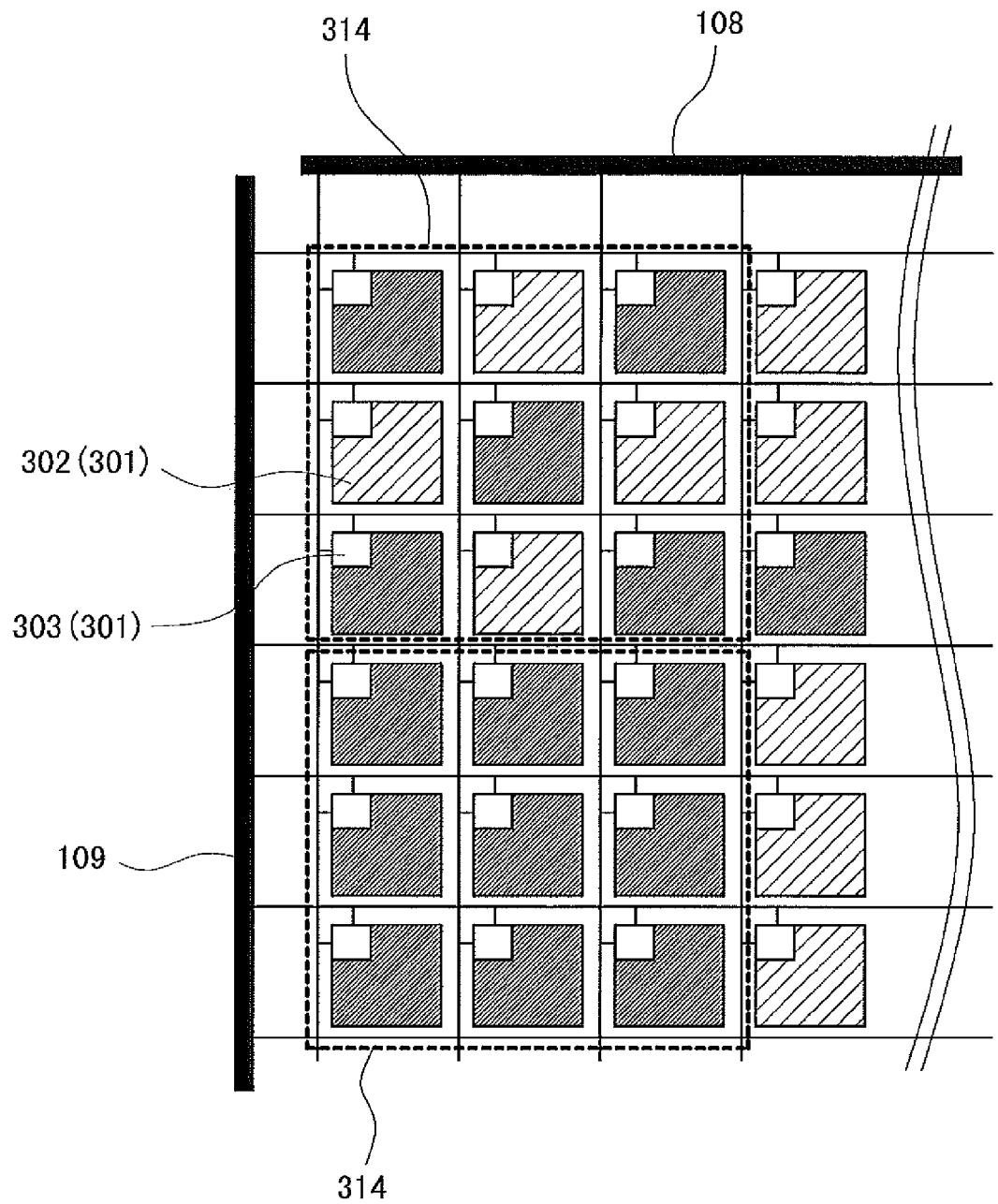
FIG. 6 shows a configuration in which the reflectances of the pixels are controlled independently for every group of regions and the reflectances are controlled with gradation.

FIG. 6 shows a configuration in which the reflectances of the pixels 301 are controlled independently for every group of regions 314 and the reflectances are controlled with gradation. The reflection sheet 110, 111 has the plurality of pixel electrodes 302 and the switching elements 303 (TFTs: thin film transistors) arranged to drive the plurality of pixel electrodes 302. The switching elements 303 are independently driven by an active matrix method. Thus, the reflectances of the pixels 301 are independently controlled.

In a case where each of the regions 314 is constituted of nine pixels 301 as shown in FIG. 6, in order to increase the reflectance of the region 314, the reflectances of all of the pixels 301 in the region 314 are increased. In order to decrease the reflectance of the region 314, the reflectances of all of the pixels 301 in the region 314 are decreased. In addition, in order to make the reflectance of the region 314 intermediate (gray), the reflectances of the pixels 301 are controlled so that pixels displayed in black (pixels with low reflectances) and pixels displayed in white (pixels with high reflectances) are alternately arranged.

Owing to the configuration in which the reflectances of the plurality of pixels 301 in one region 314 are made different, the reflectance of the entire region 314 can be controlled with gradation. In addition, the combination of the configuration described above with the configuration of controlling the reflectances of the pixels 301 with gradation allows for more fine control of the reflectances of the regions 314 with gradation.

Figure 7:
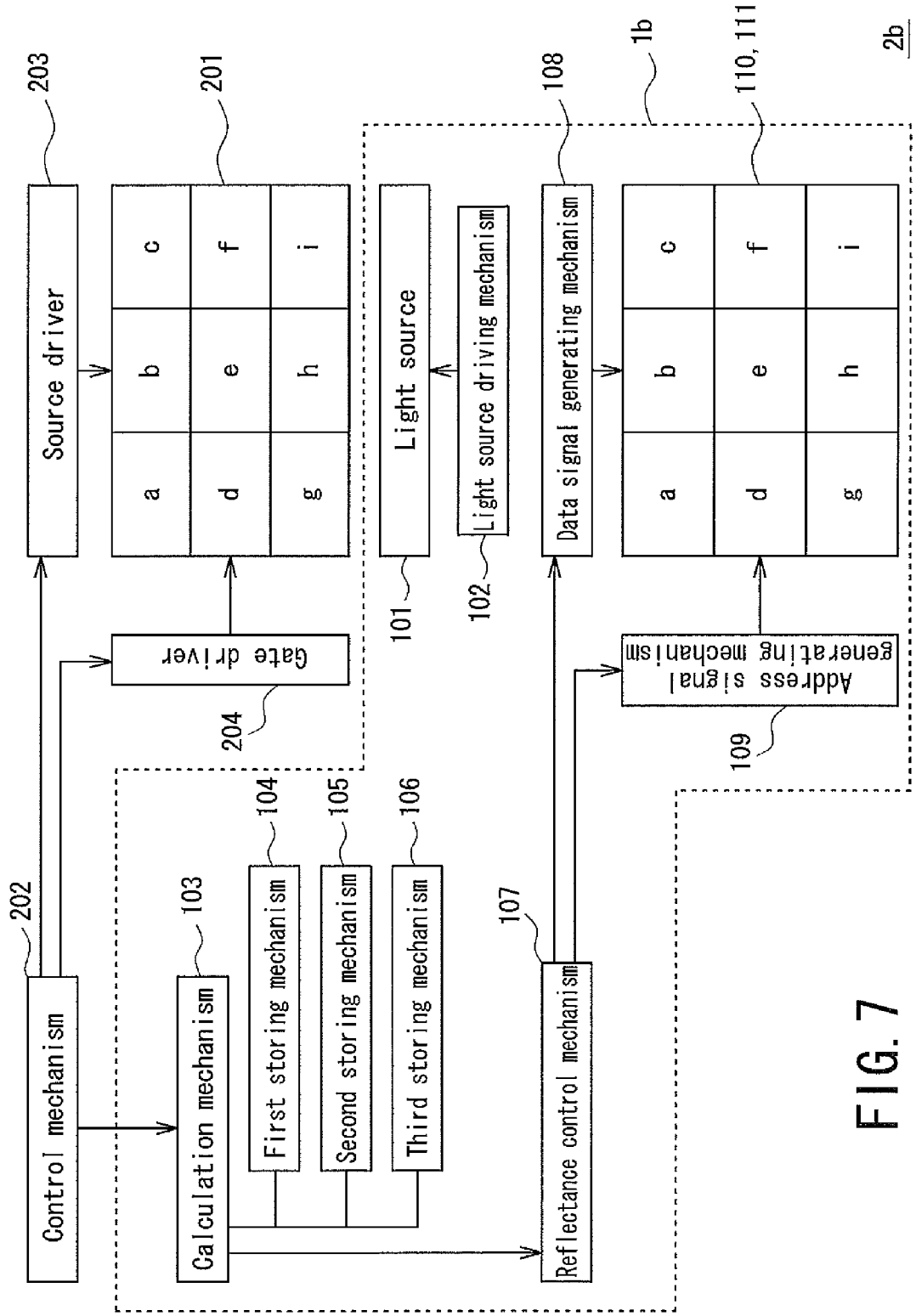
FIG. 7 is a block diagram schematically showing a configuration of the light source device and the display device in which the reflection sheet is divided into regions and reflectances of the divided regions are independently controlled.

The configuration described above allows for a configuration such that the display panel 201 is divided into several regions 205, the reflection sheet 110, 111 is divided into regions 314 to correspond to the divided regions 205, and the reflectances of the divided regions 314 are independently controlled. FIG. 7 is a block diagram schematically showing the configuration of a light source device 1b and a display device 2b having the configuration described above.

To be specific, as shown in FIG. 7, the display panel 201 (the image displayed thereon) is divided into a given number of regions 205. In addition, the reflection sheet 110, 111 is divided into regions 314 so as to correspond to the divided regions 205 of the display panel 201. FIG. 7 shows a configuration in which the display panel 201 (the image displayed thereon) is divided into nine regions 205 (regions "a" to "i") and the reflection sheet 110, 111 is divided into nine regions 314 (regions "a" to "i") so as to correspond to the divided regions 205.

The first storing mechanism 104 is arranged to store data of an image of the immediately preceding frame for each of the divided regions 205. The second storing mechanism 105 is arranged to accumulatively store image data of a plurality of frames for each of the divided regions 205. The calculation mechanism 103 is arranged to calculate an average luminance of each of the regions 205 based on the image data for each of the regions 205 that are stored in the first storing mechanism 104 and the second storing mechanism 105 and calculate the reflectances of the regions 314 of the reflection sheet 110, 111 based on the calculated average luminance. The third storing mechanism 106 is arranged to store the reflectances of the regions 314 of the reflection sheet 110, 111 that are calculated by the calculation mechanism 103.

The reflectance control mechanism 107 converts the reflectances of the regions 314 stored in the third storing mechanism 106 into reflectance control signals. The converted reflectance control signals are outputted to the data signal generating mechanism 108 and the address signal generating mechanism 109 in order to drive the reflection sheet 110, 111. The data signal generating mechanism 108 and the address signal gene rating mechanism 109 control the reflectances of the regions 314 based on the reflectance control signals.

For example, among the regions 205 of the display panel 201, in the region 205 in which the average luminance is low, the reflectance of the region 314 of the reflection sheet 110, 111 that corresponds to said region 205 is decreased. Among the regions 205 of the display panel 201, in the region 205 in which the average luminance is high, the reflectance of the region 314 of the reflection sheet 110, 111 that corresponds to said region 205 is increased. Among the regions 205 of the display panel 201, in the region 205 in which the average luminance is intermediate, the reflectance of the region 314 of the reflection sheet 110, 111 that corresponds to said region 205 is made intermediate. As described above, in response to the average luminances of the regions 205 of the display panel 201, the reflectances of the regions 314 of the reflection sheet 110, 111 that correspond to said regions 205 are controlled. Owing to this configuration, luminance of a dark portion of the image displayed on the display panel 201 of the display device 2b may be lowered, by which improvement of the contrast ratio is achieved.

In controlling the reflectance of the reflection sheet 110, 111, it is preferable that the boundary between a bright portion and a dark portion of the image displayed on the display panel 201 and the boundary between a bright portion and a dark portion of the reflection sheet 110, 111 do not coincide with each other but deviate from each other to some degree, or that the outlines of the bright portion and the dark portion of the image displayed on the display panel 201 and the outlines of the bright portion and the dark portion of the reflection sheet 110, 111 do not coincide with each other but deviate from each other to some degree. This allows the improvement of the contrast ratio of the image displayed on the display panel 201 to be achieved without strangeness.

Owing to the light source device 1a, 1b according to the first preferred embodiment of the present invention, the reflection sheet 110, 111 is provided with the capability of partially changing the reflectances with gradation, which achieves improvement of the contrast ratio. In other words, a problem that black color in a darkest portion (a portion displayed in black) does not settle enough when a peak luminance at a brightest portion (a portion displayed in white) on the screen of the display panel 201 is increased is solved.

Next, descriptions of a light source device 1c according to a second preferred embodiment of the present invention and a display device 2c including the light source device 1c (a display device according to the second preferred embodiment of the present invention) will be provided. It should be noted that elements common to the first preferred embodiment of the present invention are assigned the same numerals, and some of the descriptions are omitted.

Figure 8:
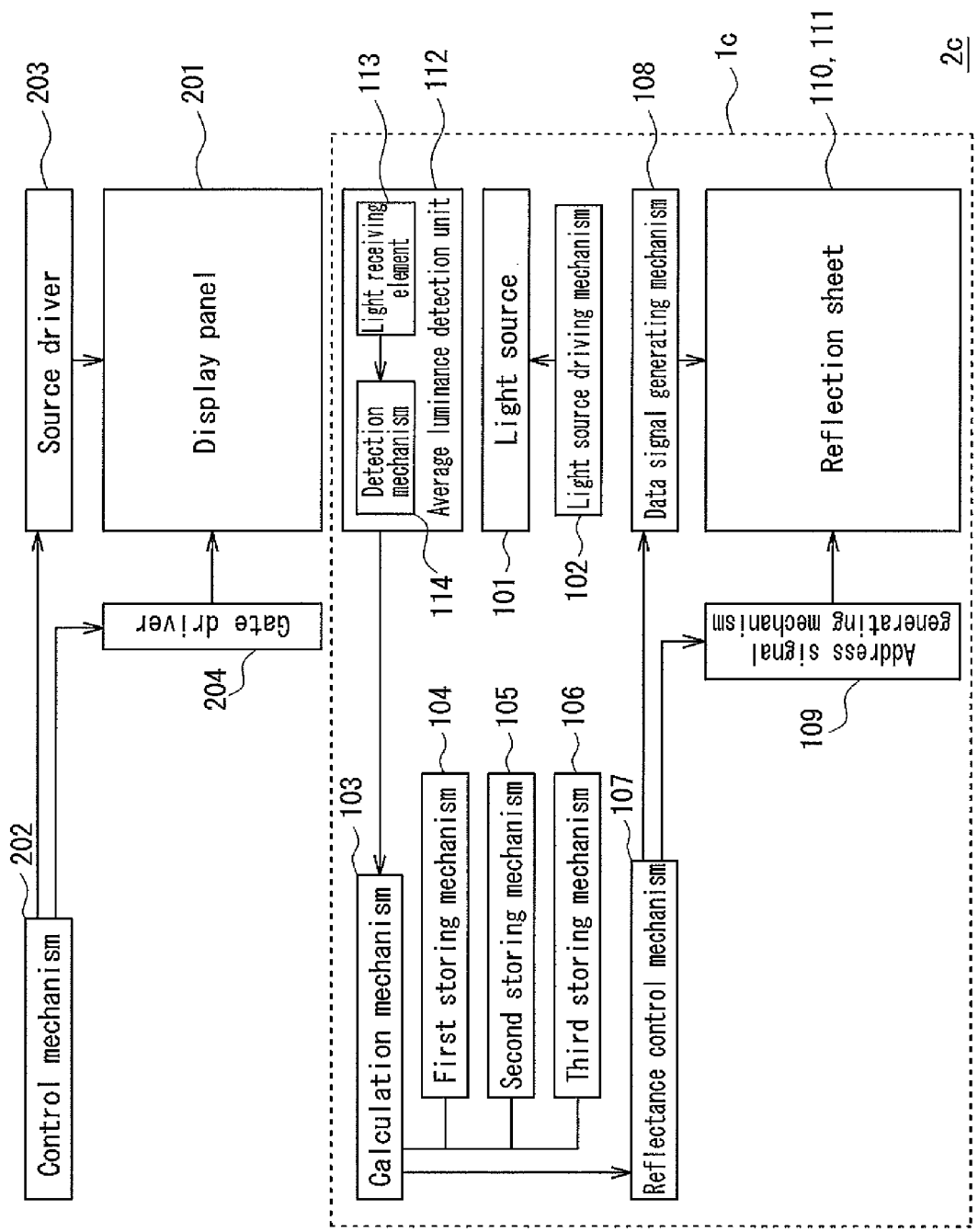
FIG. 8 is a block diagram schematically showing a configuration of a light source device 1c according to a second preferred embodiment of the present invention and a display device 2c including the light source device 1c.

FIG. 8 is a block diagram schematically showing the configuration of the light source device 1c according to the second preferred embodiment of the present invention and the display device 2c including the light source device 1c.

As shown in FIG. 8, the light source device 1c according to the second preferred embodiment of the present invention includes the light sources 101, the light source driving mechanism 102, the calculation mechanism 103, the first storing mechanism 104, the second storing mechanism 105, the third storing mechanism 106, the reflectance control mechanism 107, the data signal generating mechanism 108, the address signal generating mechanism 109, the reflection sheet 110, 111, and the average luminance detection unit 112.

The display device 2c according to the second preferred embodiment of the present invention includes the light source device 1c according to the second preferred embodiment of the present invention, the display panel 201, the control mechanism 202, the source drivers 203, and the gate drivers 204.

The average luminance detection unit 112 detects average luminances of given regions 205 of the image displayed on the display panel 201. The first storing mechanism 104 is arranged to store an average luminance of an image of the immediately preceding frame to the image detected by the average luminance detection unit 112. The second storing mechanism 105 is arranged to store data of a plurality of frames of the average luminance detected by the average luminance detection unit 112. The calculation mechanism 103 calculates the reflectances of the regions 314 of the reflection sheet 110, 111 (corresponding to the regions 205 of the display panel 201) based on the average luminances of the regions 205 stored in the first storing mechanism 104 and the second storing mechanism 105. The third storing mechanism 106 is arranged to store the reflectances of the regions 314 that are calculated by the calculation mechanism 103.

The reflectance control mechanism 107 generates reflectance control signals based on the reflectances of the regions 314 that are stored in the third storing mechanism 106. The generated reflectance control signals are transmitted to the address signal generation mechanism 109 and the data signal generation mechanism 108. The address signal generation mechanism 109 and the data signal generation mechanism 108 control the reflectances of the regions 314 of the reflection sheet 110, 111 based on the transmitted reflectance control signals.

For the average luminance detection unit 112, light receiving elements 113 (photoelectric conversion elements) arranged to convert photo-receiving light to electric signals may be used. To be specific, a photodiode may be used. Current (voltage) generated by photoelectric effect of the light receiving elements 113 is converted to luminance data through signal conversion by a detection mechanism 114. The converted signals are transmitted to the calculation mechanism 103 as described above. The light receiving elements 113 are located on the front side of the display panel 201 such that image display is not impaired. In addition, the light receiving elements 113 are located so as to detect the luminance of each of the regions 314 the reflectances of which are to be controlled.

Figure 9:
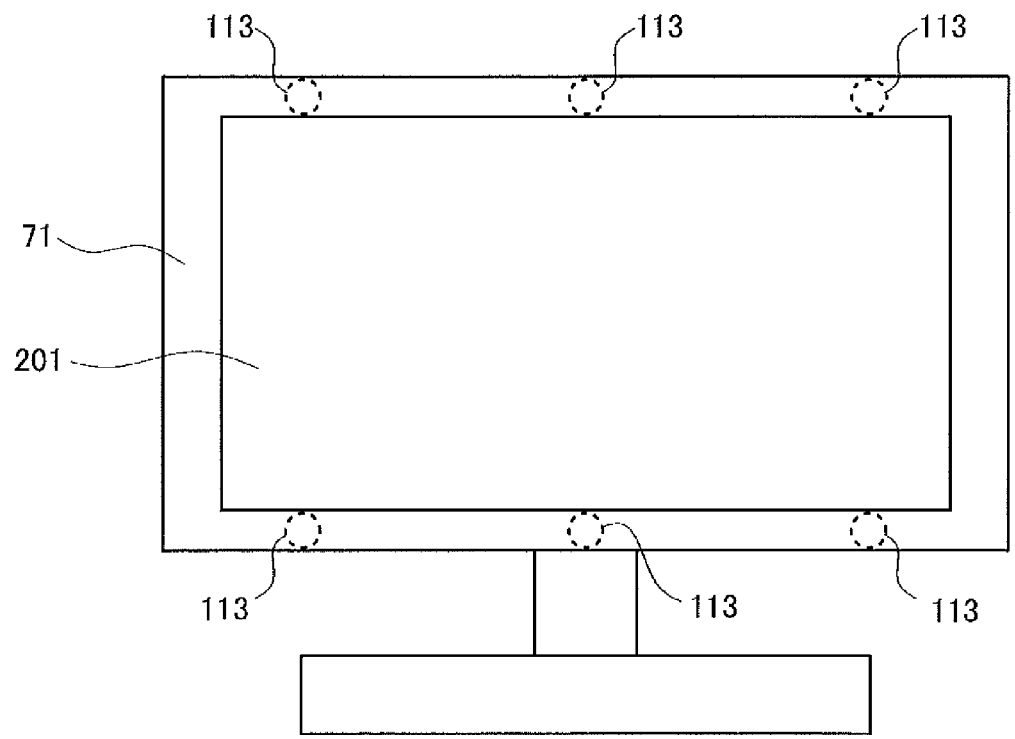
FIG. 9 is a view schematically showing location of light receiving elements in a case where a display panel is divided into six regions and reflectances of the divided regions are independently controlled.

FIG. 9 is a view schematically showing location of the light receiving elements 113 in a configuration in which the display panel 201 is divided into six regions 205 and the reflectances of the regions 205 are independently controlled. As shown in FIG. 9, the light receiving elements 113 are located on the front side of the display panel 201 such that image display is not impaired. To be specific, the light receiving elements 113 are located outside the display panel 201 as shown in FIG. 9. The light receiving elements 113 are located to detect the luminances of the region 205 the reflectances of which are to be controlled.

Figure 10:
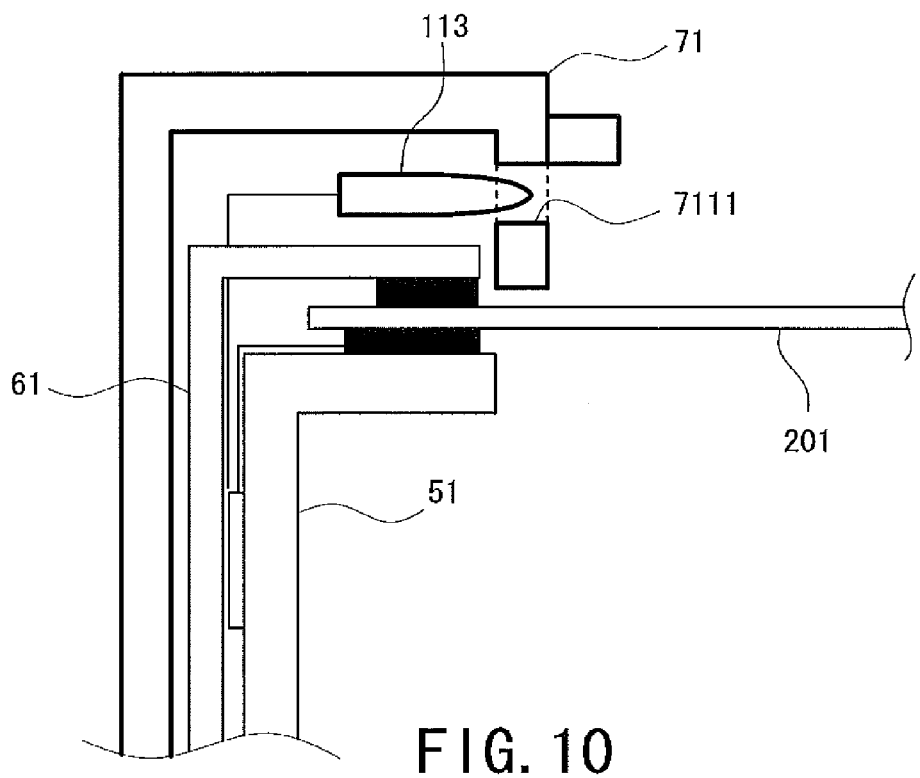
FIG. 10 is a view schematically showing the arrangement of the light receiving elements and is a cross sectional view showing cross sectional structure of a portion of the display device according to the second preferred embodiment of the present invention.

FIG. 10 is a schematic view showing location structure of the light receiving elements 113, and is a cross sectional view showing cross sectional structure of a portion of the display device 2c according to the second preferred embodiment of the present invention. The display device 2c according to the second preferred embodiment of the present invention includes the display panel 201, a frame 51, a bezel 61, an outside frame (cabinet) 71, the light receiving elements 113, and other given members. As shown in FIG. 10, the display panel 201 is fixedly located between the frame 51 and the bezel 61. The bezel 61 is protected and decorated by the outside frame (cabinet) 71.

The light receiving elements 113 are located at given positions inside the outside frame (cabinet) 71. In order to allow the light receiving elements 113 to receive the light from the display panel 201, through holes 7111 are provided in the wall on the display panel 201 side of the outside frame (cabinet) 71. The light receiving elements 113 receive the light from the display panel 201 through the through holes 7111. It should be noted that the location of the light receiving elements 113 is not limited to the location described above. For example, the light receiving elements 113 may be located between the display panel 201 and the bezel 61.

Figure 11:
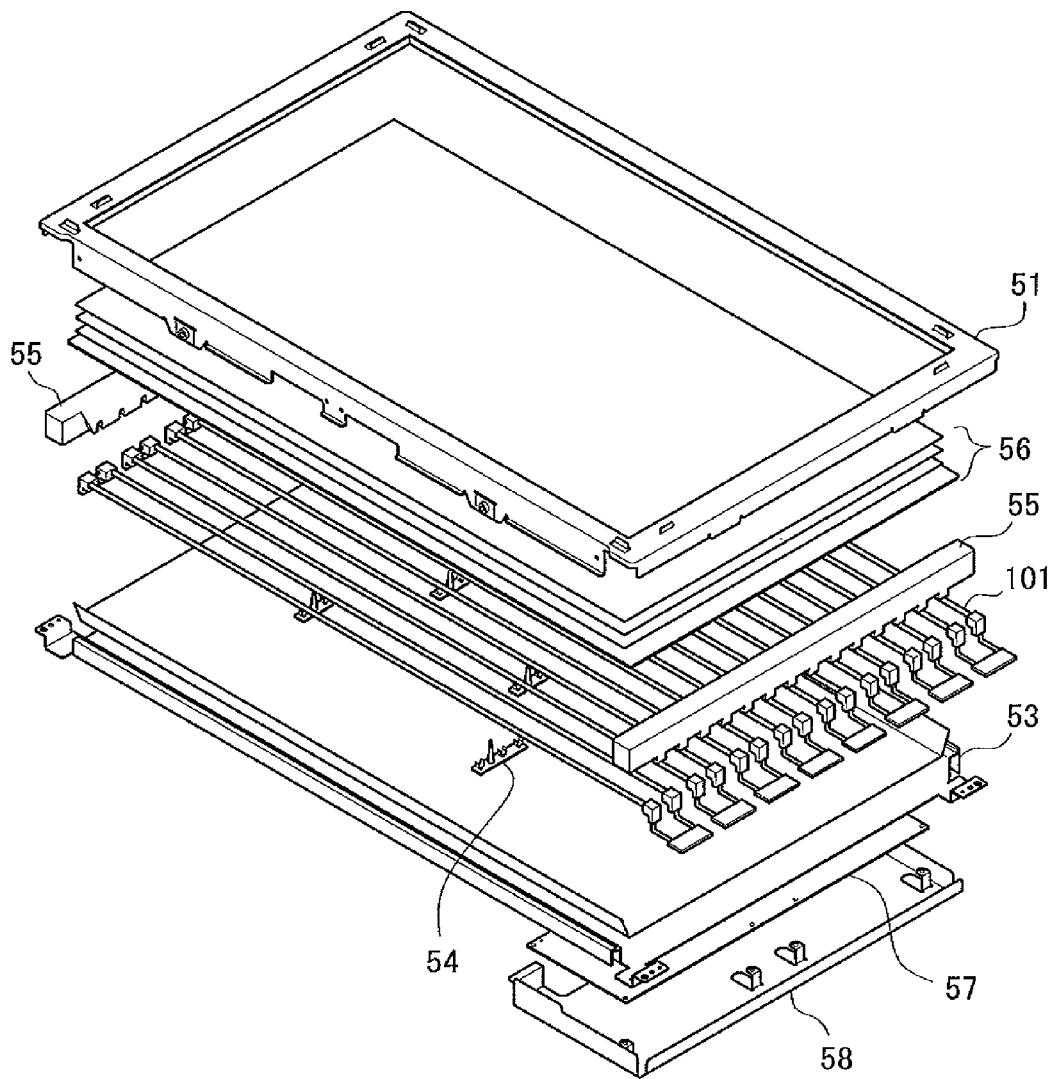
FIG. 11 is an exploded perspective view schematically showing a configuration of a main portion of the light source device according to the first preferred embodiment of the present invention.

FIG. 11 is an exploded perspective view schematically showing a configuration of a main portion of the light source device 1a according to the first preferred embodiment of the present invention. For the purpose of illustration, the upper side of FIG. 11 corresponds to the front side of the light source device 1a according to the first preferred embodiment of the present invention and the lower side of FIG. 11 corresponds to the back side of the light source device 1a.

As shown in FIG. 11, the light source device 1a according to the first preferred embodiment of the present invention includes the chassis 53, the light sources 101, the reflection sheet 110, 111 arranged to perform display with gradation having two values of white and black or greater values (i.e., a reflection sheet arranged to change the reflectance of the surface with gradation), lamp clips 54, side holders 55, optical sheets 56, a frame 51, a light source driving circuit board 57, and a light source driving circuit board cover 58. The light sources 101, the chassis 53, the side holders 55, the optical sheets 56, the light source driving circuit board 57, and the light source driving circuit board cover 58 may be conventional ones, and therefore, brief descriptions are provided, and detailed descriptions are omitted.

The chassis 53 is a member having a substantially tray shape having a substantially plate shape and is preferably made from a metal plate material by press working. For the light sources 101, a variety of conventional linear light sources may be used, for example, fluorescent tubes such as cold cathode fluorescent tubes and hot cathode fluorescent tubes, discharge tubes such as xenon tubes, and light emitting devices such as light emitting diodes. In the preferred embodiments of the present invention, linear cold cathode fluorescent tubes are used. The side holders 55 function, for example, as spacers for disposing the optical sheets 56 to be described later. The side holders 55 have a substantially bar shape, and each of the side holders 55 is of a monolithic construction made from a resin material, for example. The lamp clips 54 are arranged to hold the light sources 101 and support the optical sheets 56 to be described later.

To the reflection sheet 110, 111, a circuit board (not shown) on which the address signal generating mechanism 109 is provided and a circuit board (not shown) on which the data signal generating mechanism 108 is provided are connected.

The optical sheets 56 are members having a sheet shape or a plate shape arranged to adjust properties of light emitted from the light sources 101 and the light reflected from the reflection sheet 110, 111, or a combination of such members. Examples of the optical sheets 56 include a diffusion plate and a diffusion sheet arranged to diffuse light, a lens sheet having a light collection function, and a polarizing reflection sheet arranged to transmit light with a given vibration direction and reflect light with a vibration direction other than the given vibration direction. Members of the optical sheets 56 are chosen as appropriate and are stacked in a given order in accordance with the kind of the light source 1a or the display device 2a.

The light source device 1a according to the first preferred embodiment of the present invention includes a diffusion plate, a diffusion sheet, and a polarizing reflection sheet as the optical sheets 56. From the back side, a diffusion plate, a diffusion sheet, a polarizing reflection sheet, and a diffusion sheet are provided in order.

The frame 51 is a member arranged to hold and/or protect the optical sheets 56 and the display panel 201 (not shown) of the display device 2a to be described later. The frame 51 has a substantially square shape with an opening. The configuration of the frame 51 may include a monolithic construction made from a resin material, a combination of a plurality of components that are made from a resin material, a monolithic construction made from a metal plate material by press working, and a combination of a plurality of components that are made from a metal plate material by press working.

The light source driving circuit board 57 is a circuit board on which electronic circuits and electric circuits arranged to drive the light sources 101 (the light source driving mechanism 102) are provided. If the light sources 101 are fluorescent tubes, an inverter circuit arranged to drive the fluorescent tubes is provided on the light source driving circuit board 57. In addition, on the light source driving circuit 57, a circuit for the calculation mechanism 103, the first storing mechanism 104, the second storing mechanism 105, and the third storing mechanism 106 is provided. The light source driving circuit board cover 58 is a member having a plate shape or a tray shape arranged to cover the light source driving circuit board 57 and is preferably made from a conductor of a metal plate material. The light source driving circuit board cover 58 protects the light source driving circuit board 57 and interrupts unnecessary emission from the light source driving circuit board 57.

A description of assembly of the light source device 1a, 1b according to the first preferred embodiment of the present invention having the members described above will be provided.

The reflection sheet 110, 111 is disposed on the front side of the chassis 53. The lamp clips 54 are disposed on the front side of the reflection sheet 110, 111. The lamp clips 54 are arranged to engage with the through holes of the reflection sheet 110, 111 and the chassis 53. If the reflection sheet 110, 111 cannot have through holes, the lamp clips 54 may be attached and fixed to the front surface of the reflection sheet 110, 111. On the front side of the reflection sheet 110, 111, the light sources 101 are arranged. The side holders 55 are disposed so as to cover the ends of the light sources 101. On the front side, the optical sheets 56 are stacked in a given order, and then, the frame 51 is attached.

The light source driving circuit board 57 is disposed on the back side of the chassis 53. A harness from the light sources 101 and the light source driving circuit board 57 are connected to each other. A circuit board (not shown) that is connected to the reflection sheet 110, 111 is connected to the light source driving circuit board 57. Then, the light source driving circuit board cover 58 is attached so as to cover the light source driving circuit board 57.

Figure 12:
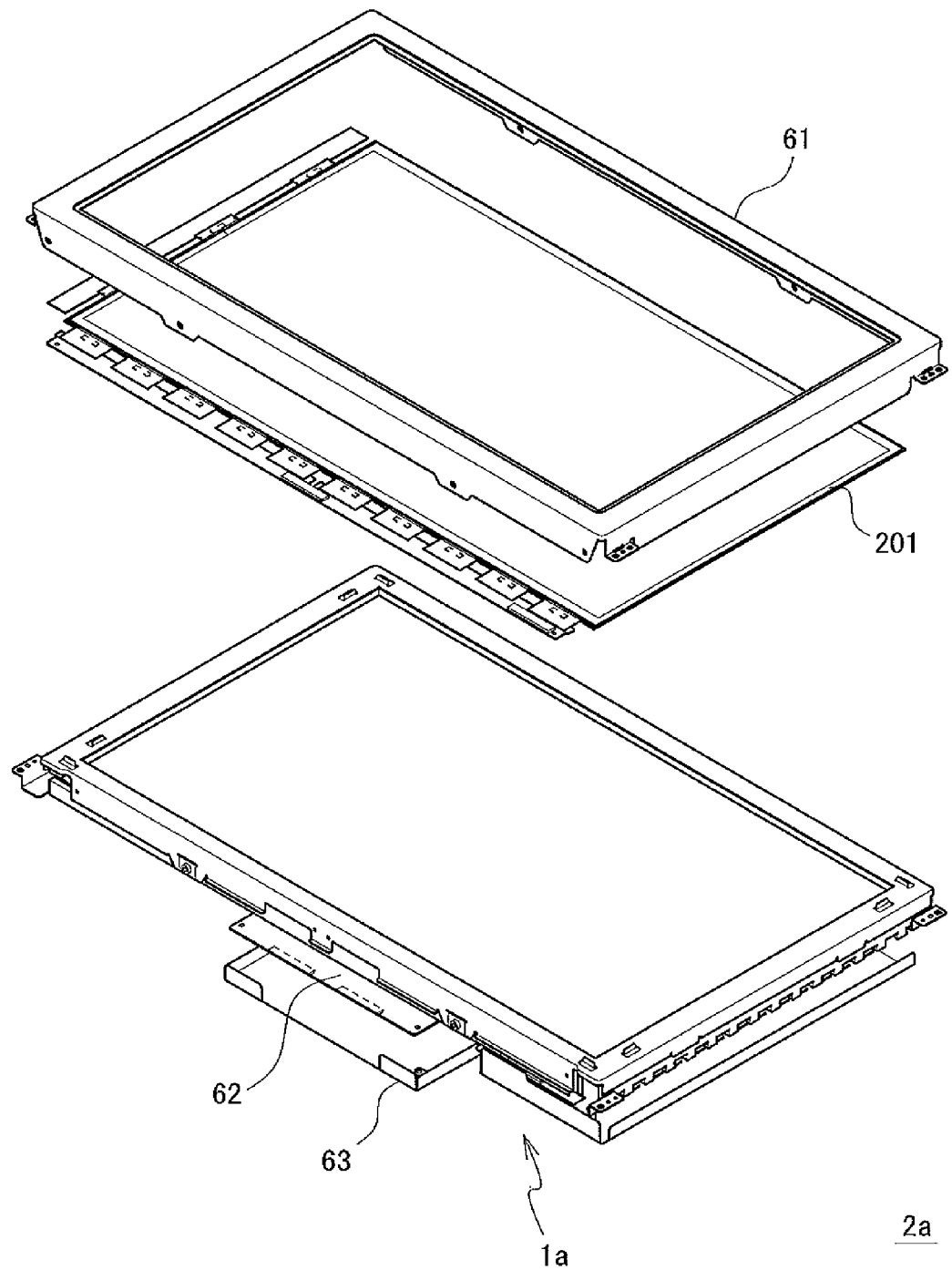
FIG. 12 is an exploded perspective view schematically showing a configuration of a main portion of the display device according to the preferred embodiments of the present invention.

Next, a description of the physical configuration of a main portion of the display device 2a, 2b including the light source device 1a, 1b according to the first preferred embodiment of the present invention (i.e., the display device according to the first preferred embodiment of the present invention) will be provided. FIG. 12 is an exploded perspective view schematically showing the configuration of the main portion of the display device 2a, 2b according to the first preferred embodiment of the present invention. The display device 2a, 2b according to the first preferred embodiment of the present invention includes the light source device 1a, 1b according to the first preferred embodiment of the present invention, the display panel 201, the bezel 61, a control circuit board 62, and a control circuit board cover 63.

For the display panel 201, a conventionally used transmission type or transflective type liquid crystal display panel may be used. For example, a generally used active matrix liquid crystal display panel is used.

The bezel 61 is a member arranged to hold and/or protect the display panel 201 and has a substantially square shape with an opening. The configuration of the bezel 61 includes a monolithic construction made from a resin material, a combination of a plurality of components that are made from a resin material, a monolithic construction made from a metal plate material by press working, and a combination of a plurality of components that are made from a metal plate material by press working.

The control circuit board 62 is a circuit board on which circuits arranged to generate signals for controlling the display panel 201 are provided, i.e., a circuit board on which a circuit for the control mechanism 202 is provided. The signals for controlling the display panel 201 are generated based on signals inputted from the outside (e.g., from a tuner). The control circuit board cover 63 is a member having a plate shape or a tray shape arranged to cover the control circuit board 62, and is preferably made from a conductor of a metal plate material. The control circuit board cover 63 protects the control circuit board 62 and interrupts unnecessary emission from the control circuit board 62.

A description of assembly of the display device 2a, 2b including the members described above will be provided.

The display panel 201 is disposed on the front side of the light source device 1a, 1b according to the first preferred embodiment of the present invention. In addition, the control circuit board 62 is disposed on the back side of the chassis 53 of the light source device 1a, 1b according to the first preferred embodiment of the present invention, and the control circuit board cover 63 is attached thereto so as to cover the control circuit board 62.

It should be noted that the physical configuration of the light source device 1c according to the second preferred embodiment of the present invention and the physical configuration of the display device 2c including the light source device 1c according to the second preferred embodiment of the present invention are substantially the same as those of the light source device 1a, 1b according to the first preferred embodiment of the present invention and the display device 2a, 2b according to the second preferred embodiment of the present invention. Differences are found in the configuration in which the light receiving elements 113 are provided to the outside frame (cabinet) 71 and in the configuration in which the circuit of the average luminance detection unit 112 is provided on the light source driving circuit board 57. Other configurations are substantially the same and descriptions thereof are omitted.

Figure 13:
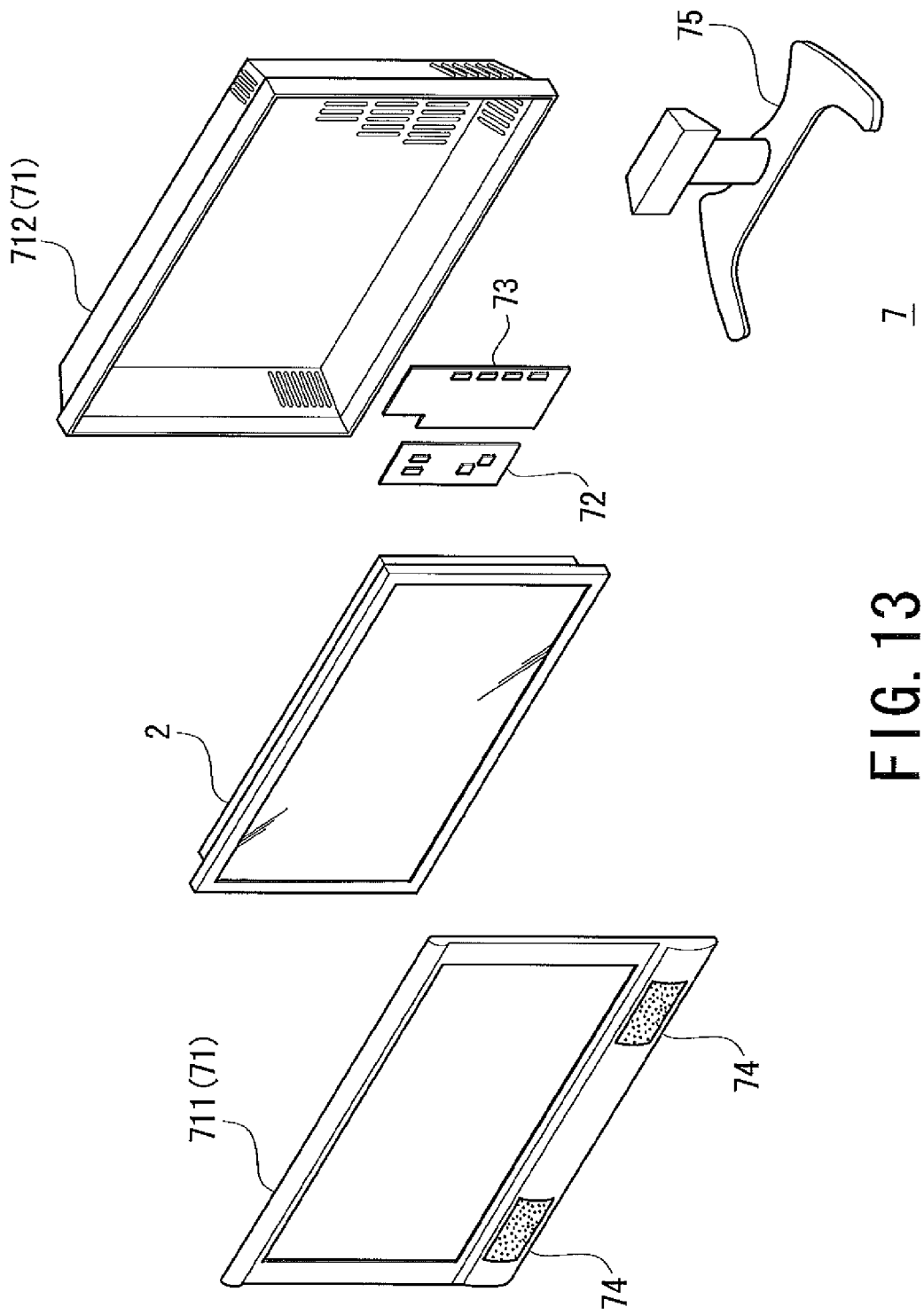
FIG. 13 is an exploded perspective view schematically showing a configuration of a main portion of a television receiver including the display device according to the preferred embodiments of the present invention.
Figure 14:
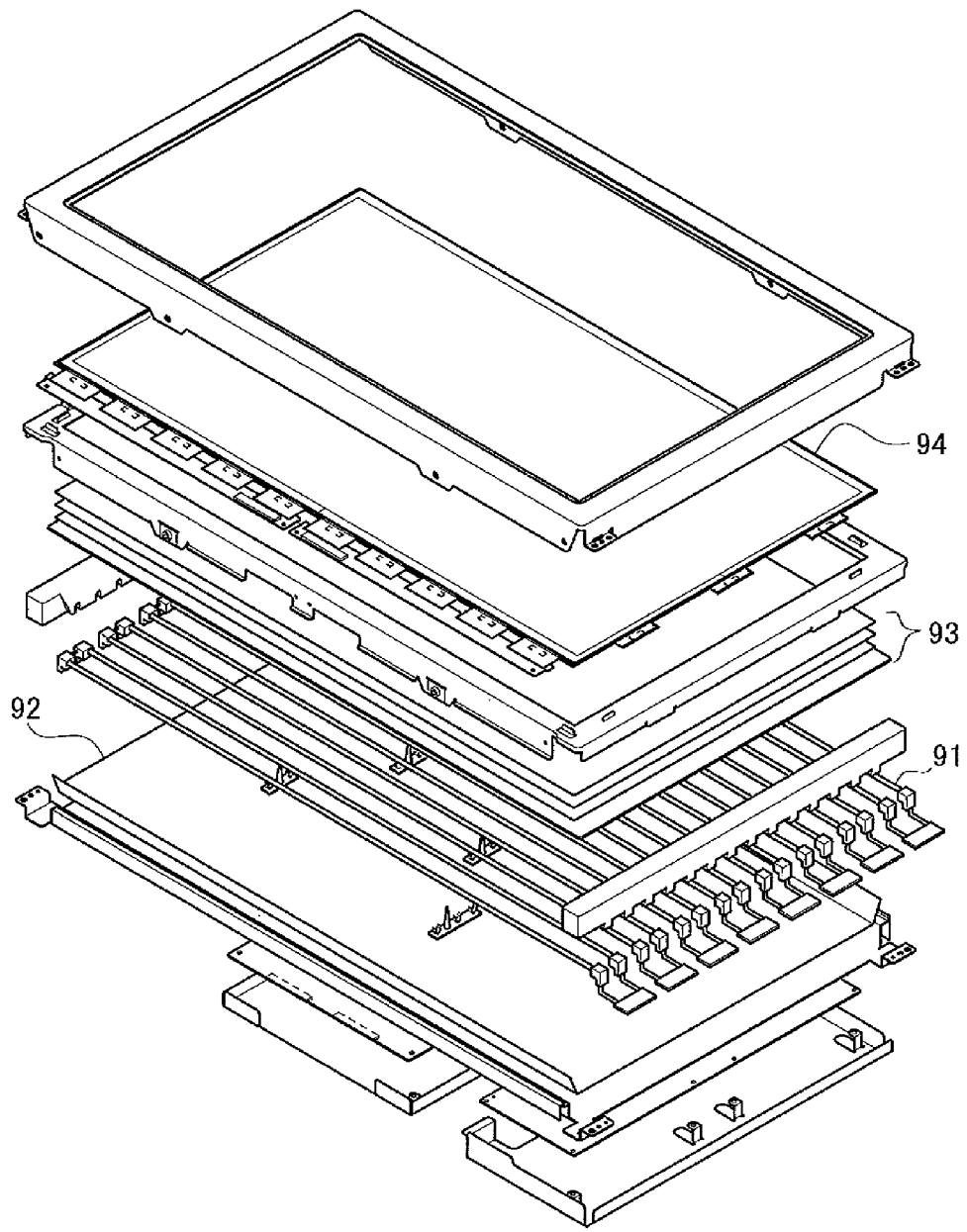
FIG. 14 is an exploded perspective view schematically showing a conventional example of a configuration of a main portion of a display device including a direct type light source device.

Next, a description of a television receiver including the display device according to the preferred embodiments of the present invention will be provided. FIG. 13 is an exploded perspective view schematically showing a configuration of a main portion of a television receiver 7 including the display device 2a, 2b, 2c according to the preferred embodiments of the present invention. The television receiver 7 includes the display device 2a, 2b, 2c according to the preferred embodiments of the present invention, a tuner 72, a loudspeaker mechanism 74, an electric power supply 73, the outside frame (cabinet) 71, and a holding member 75.

The tuner 72 is a circuit board on which a circuit arranged to generate video signals and sound signals of a given channel based on received radio waves and electric signals inputted from the outside is provided. For the circuits provided on the tuner 72, any one or some of a conventional terrestrial tuner (one or both of analog terrestrial waves and digital terrestrial waves), BS tuner, or CS tuner can be used.

The loudspeaker mechanism 74 generates a sound to the outside based on the sound signals produced by the tuner 72. For the loudspeaker mechanism 74, a conventional loudspeaker mechanism such as a generally used loudspeaker can be used. The electric power supply 73 supplies power to the display device 2a, 2b, 2c according to the preferred embodiments of the present invention, the tuner 72 and the loudspeaker mechanism 74.

As shown in FIG. 13, the display device 2a, 2b, 2c according to the preferred embodiments of the present invention, the tuner 72, the loudspeaker mechanism 74, and the electric power supply 73 are housed in the cabinet 71, and the cabinet 71 is supported by the supporting member 75. In FIG. 13, the cabinet 71 includes a front side cabinet 711 and a back side cabinet 712. Between the front side cabinet 711 and the back side cabinet 712, the display device 2a, 2b, 2c according to the preferred embodiments of the present invention, the tuner 72, the loudspeaker mechanism 74, and the electric power supply 73 are housed.

While preferred embodiments of the present invention have been described above, it is to be understood that variations and modifications will be apparent to those skilled in the art without departing the scope and spirit of the present invention. The scope of the present invention, therefore, is to be determined solely by the following claims. The descriptions have been given on the display device in which an arrangement of the light sources with respect to the display panel is a back light type (direct type). However, the present invention may be applied also to a display device in which an arrangement of light sources with respect to the display panel is a side edge type. In addition, the present invention may be applied also to a reflection display device that does not have light sources and uses external light. The configuration of the electric paper that is used as the reflection sheet is not limited to the preferred embodiments of the present invention and a variety of electric papers may be used.

What is claimed is:

1. A display device comprising:
  a light source device including:
    a light source arranged to emit light; and
    a reflection sheet arranged to reflect the light emitted from the light source;
  a display panel arranged to display an image; and
  a control mechanism arranged to control the display panel such that a reflectance of a portion of a surface of the reflection sheet of the light source device is changed with gradation in response to light and dark of portions of the image displayed on the display panel; wherein
  the light source device further comprises:
    a first storing mechanism and a second storing mechanism arranged to store signals generated by the control mechanism;
    a calculation mechanism arranged to calculate reflectances of portions of the reflection sheet based on the signals that are stored in the first storing mechanism and the second storing mechanism;
    a third storing mechanism arranged to store the reflectances calculated by the calculation mechanism; and
    a reflectance control mechanism arranged to control the reflection sheet based on the reflectances stored in the third storing mechanism.

2. The display device according to claim 1, wherein the surface of the reflection sheet is divided into a plurality of regions; and
  reflectances of the divided regions are independently changeable with gradation.

3. The display device according to claim 1, wherein the reflection sheet comprises a plurality of pixel electrodes and switching elements arranged to drive the plurality of pixel electrodes.

4. The display device according to claim 1, wherein the reflection sheet is an electric paper.

5. The display device according to claim 1, wherein the second storing mechanism is arranged to accumulatively store image data of a plurality of frames of the image displayed on the display panel; and
  the calculation mechanism is arranged to calculate the reflectance based on an average luminance of the image data accumulatively stored in the second storing mechanism.

6. The display device according to claim 1, further comprising an average luminance detection unit arranged to detect average luminances of portions of the image displayed on the display panel; wherein
  reflectances of portions of the reflection sheet are changed with gradation based on the average luminances of the portions of the image displayed on the display panel that are detected by the average luminance detection unit.

* * * * *